May 15, 1951 A. J. BRADFORD 2,553,075
STILL PICTURE PROJECTION MACHINE
Filed Sept. 28, 1946 6 Sheets-Sheet 2
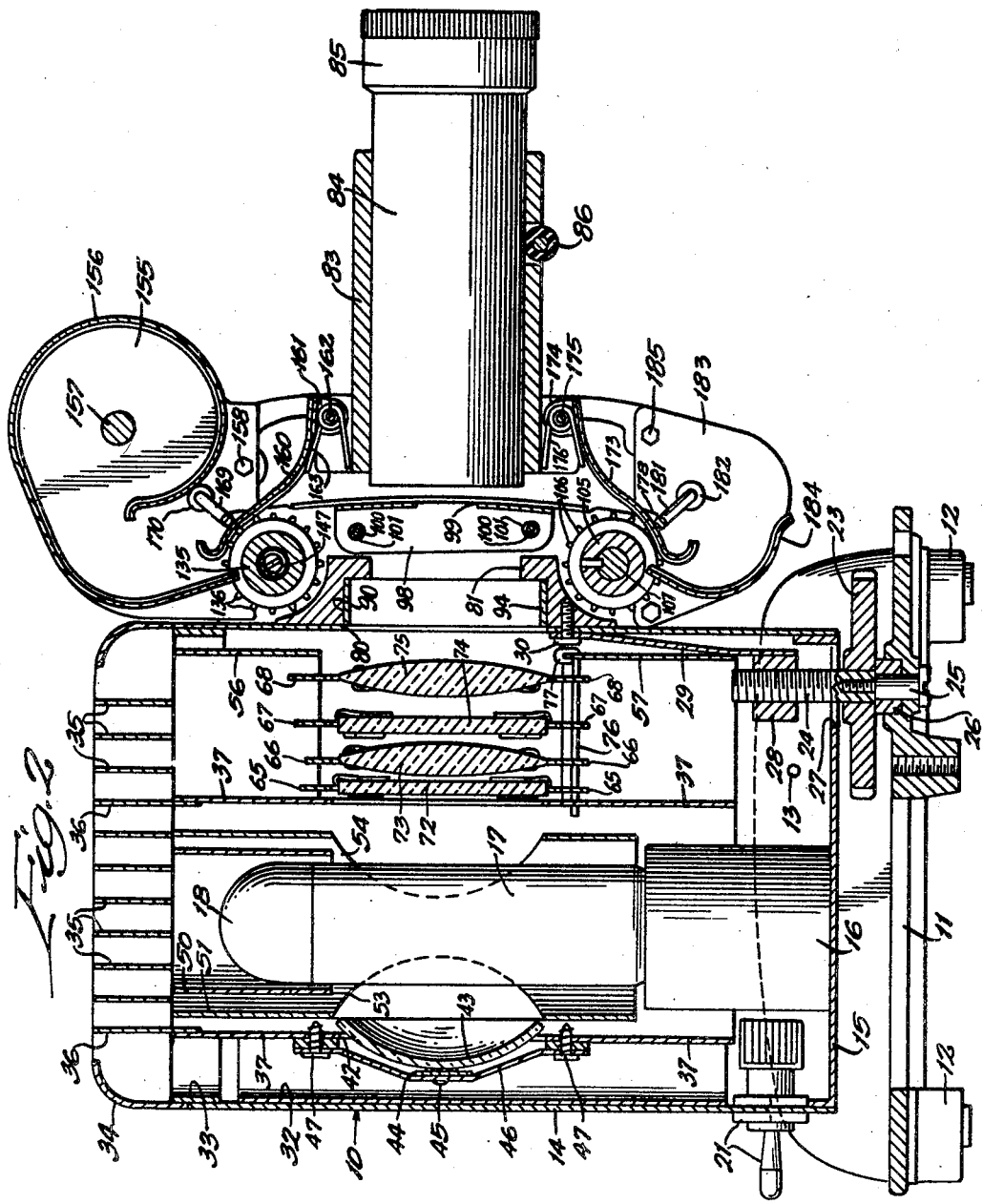
Inventor:
Arthur J. Bradford,
By Dawson, Booth and Spangenberg,
Attorneys.

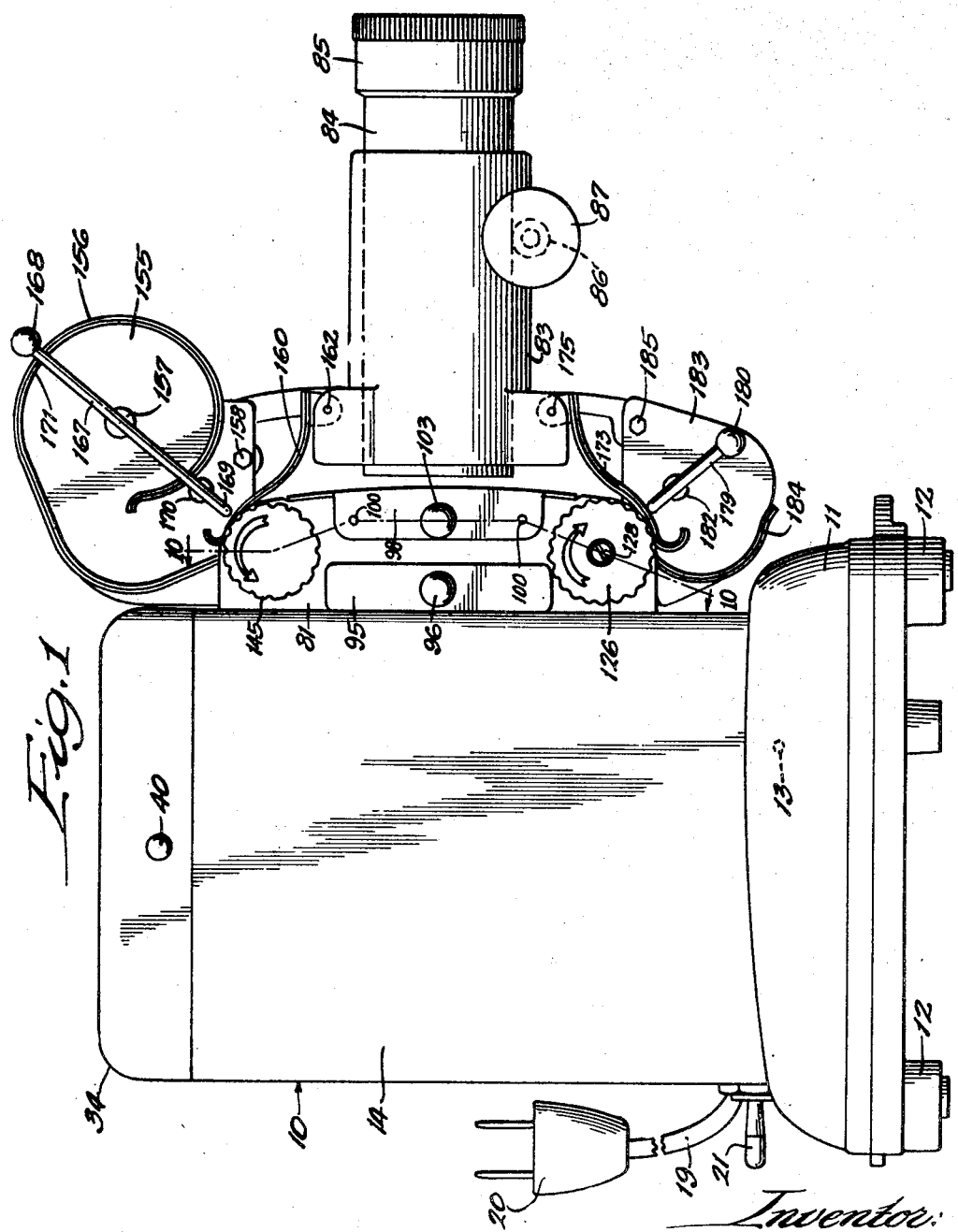

May 15, 1951 A. J. BRADFORD 2,553,075
STILL PICTURE PROJECTION MACHINE
Filed Sept. 28, 1946 6 Sheets-Sheet 3
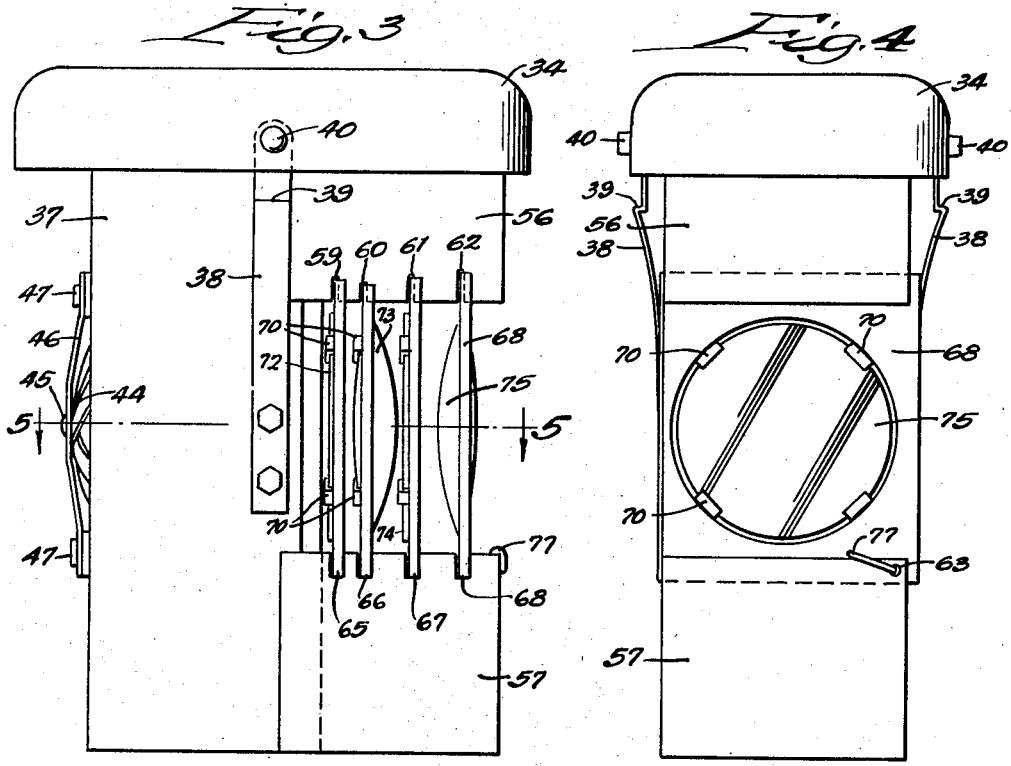
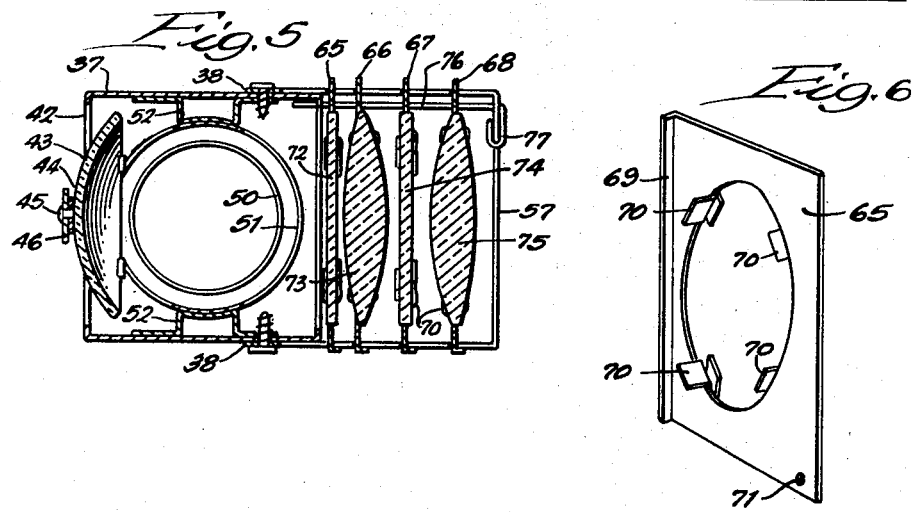
Inventor:
Arthur J. Bradford,
By Dawson, Booth my Spangenberg,
Attorneys

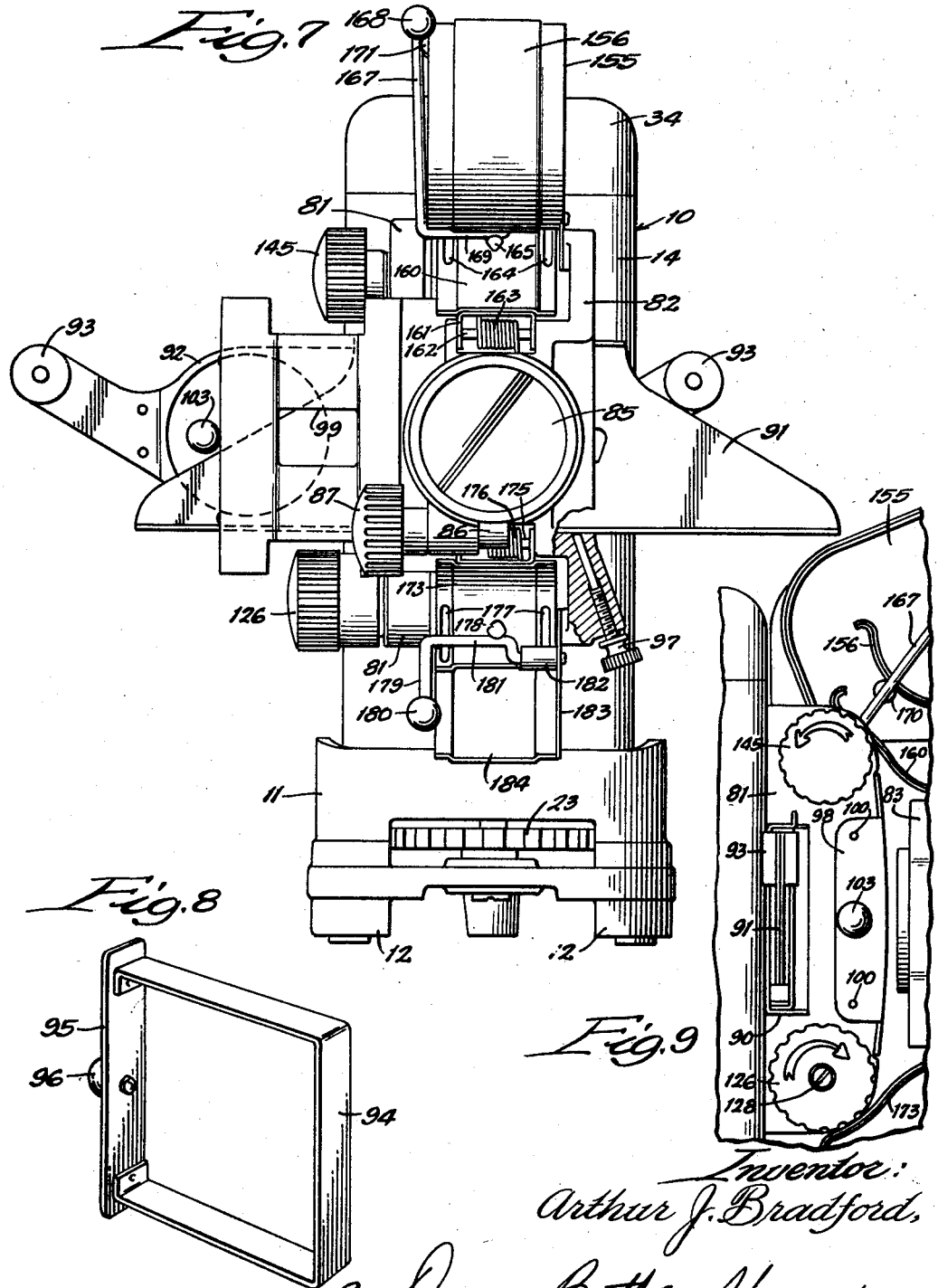

May 15, 1951 A. J. BRADFORD 2,553,075
STILL PICTURE PROJECTION MACHINE
Filed Sept. 28, 1946 6 Sheets-Sheet 5
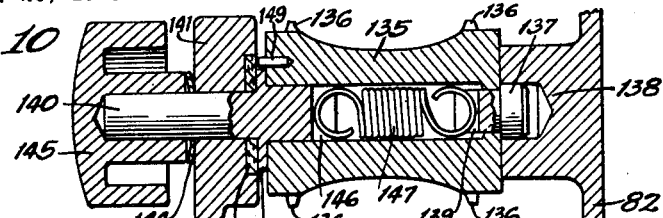
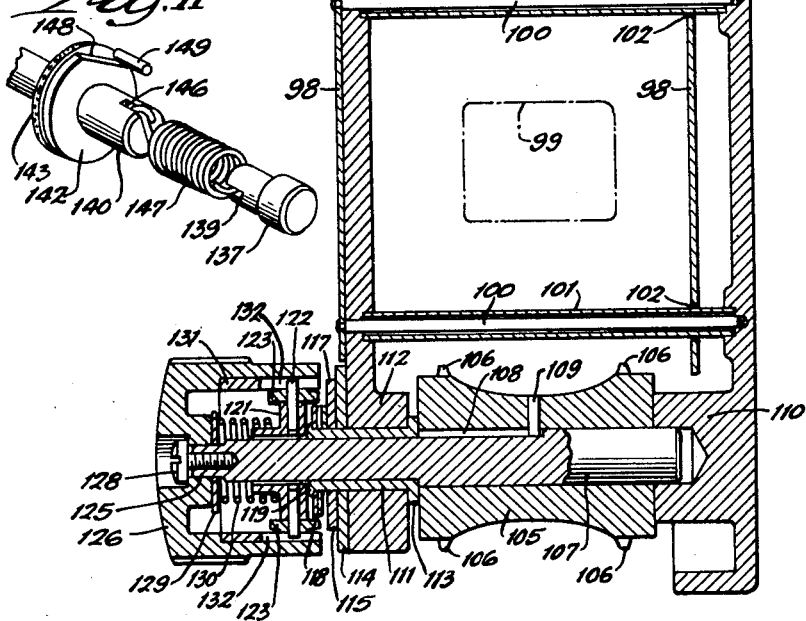
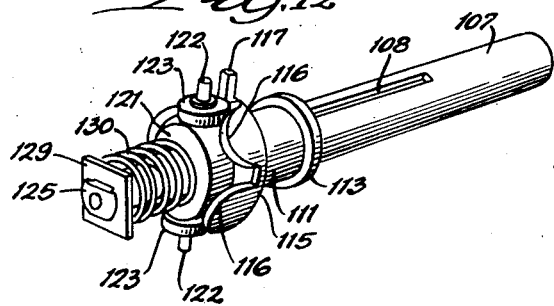
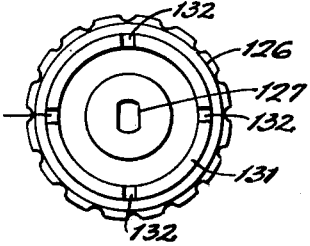
Inventor:
Arthur J. Bradford,
By Dawson, Brothers & Spangenberg,
Attorneys.

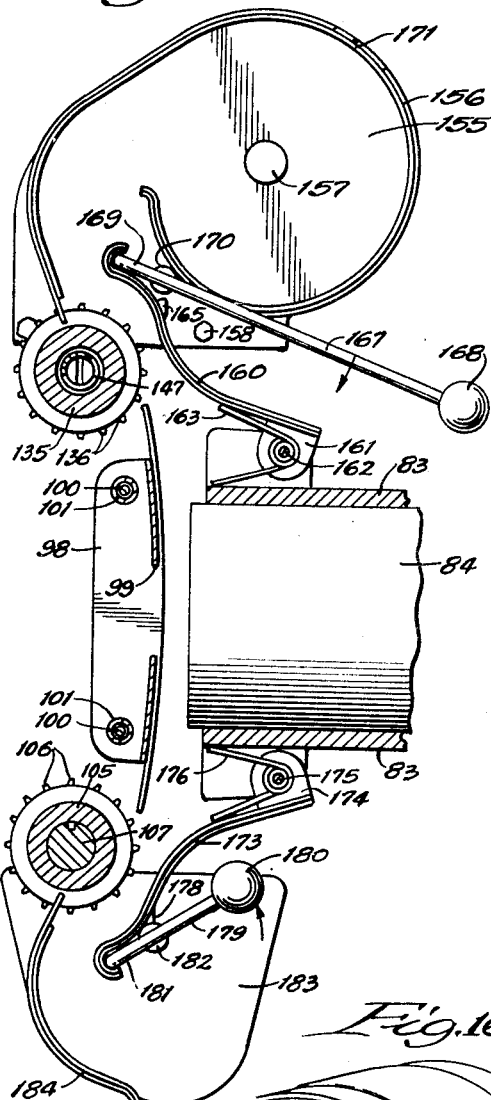

Patented May 15, 1951

2,553,075

UNITED STATES PATENT OFFICE 2,553,075

STILL PICTURE PROJECTION MACHINE

Arthur J. Bradford, Wilmette, Ill., assignor, by mesne assignments, to Ampro Corporation, Chicago, Ill., a corporation of Illinois Application September 28, 1946, Serial No. 700,049

4 Claims. (Cl. 88—28)

This invention relates to projection machines for projection of pictures and the like from slides or films.

An object of this invention is to provide an improved projection machine wherein mechanism is provided between the source of light and the adjustable focusing lens for inserting film in one transverse plane between the source of light and the adjustable focusing lens and for inserting slides in another transverse plane between the source of light and the adjustable focusing lens. By reason of this two-plane mechanism, slides or films may be readily projected from the same machine without requiring disassembly and reassembly of the machine. In accordance with this invention, the mechanism may include a film guide having a light transmitting aperture for guiding the film in one transverse plane and it may include a slide shifter support for receiving and supporting the slide shifter in the other plane. Means may also be provided for moving the film guide laterally out of the light path when a slide is projected and means may further be provided for laterally closing the slide shifter support when a film is to be projected.

Another object of this invention is to provide an improved mechanism for moving the film along a film guide. In this connection, a sprocket is provided at one end of the film guide for drawing the film along the guide and a sprocket is provided at the other end of the film guide for normally feeding the film to the film guide. The feeding sprocket is provided with a friction brake to hold back and apply tension to the film on the guide as the film is being moved by the other sprocket. The feeding sprocket may also be rotated to provide reverse feed of the film.

Further objects of this invention reside in the details of construction of the component parts of the projection machine and the cooperative relation therebetween.

Other objects and advantages will become apparent to those skilled in the art upon reference to the accompanying specification, claims, and drawings in which:

Figure 1 is a side elevational view of the projection machine;

Figure 2 is a vertical sectional view through the projection machine of Figure 1;

Figure 3 is a side elevational view of the light concentrating box;

Figure 4 is a front elevational view of Figure 3;

Figure 5 is a sectional view taken substantially along the line 5—5 of Figure 3;

Figure 6 is a perspective view of one of the plates for supporting the filters and concentrating lenses;

Figure 7 is a front elevational view of the projection machine with the slide shifter in place;

Figure 8 is a perspective view of a shield for covering the side openings of the slide shifter support;

Figure 9 is a partial side elevational view similar to Figure 1, but illustrating the slide shifter in place;

Figure 10 is a vertical front sectional view taken substantially along the line 10—10 of Figure 1;

Figure 11 is a partial perspective view of a part of the mechanism shown in the upper portion of Figure 10;

Figure 12 is a partial perspective view showing a part of the mechanism of the lower portion of Figure 10;

Figure 13 is an elevational view of the lower knob of Figure 10 looking from the right;

Figure 14 is an enlarged partial sectional view of the film guiding mechanism showing the pivoted arms in free position;

Figure 15 is a view similar to Figure 14, but showing the pivoted arms in guiding position;

Figure 16 is a partial perspective view of a portion of the container of Figure 14;

Figure 17 is a perspective view of the lower pivoted lever of Figure 14.

The projection machine is generally designated at 10 in Figures 1, 2, and 7 and it includes a base 11 provided with supporting feet 12. The base 11 is also provided with internal pins 13 received in openings in the side walls of a lamp box 14. The lamp box 14 is substantially rectangular in cross section and is open at the top and bottom, as shown in Figure 2. Across the bottom of the lamp box is suitably secured a strip 15 for carrying a lamp socket 16 which in turn receives a lamp 17 having an opaque top 18. Electrical energy is supplied to the lamp socket 16 and hence to the lamp 17 by a cord 19 provided with a suitable plug 20. A switch 21 makes and breaks the electrical connections for turning on and off the lamp 17.

A wheel 23 carried by a screw threaded shaft 24 is provided with a bearing extension 25 rotating in a bearing sleeve 26 carried by the base 11. The screw threaded shaft 24 extends upwardly through an opening 27 in the strip 15 and the screw threadedly engages a nut 28 carried by a leaf spring 29 which in turn is secured to the lamp box 14 by a screw 30. By rotating the wheel 23 in one direction, the nut 28 is drawn downwardly to cause clockwise movement of the lamp box 14 about the pivots 13, thereby tilting the projection machine in one direction. Upon reverse rotation of the wheel 23, the nut 28 is driven upwardly whereby the lamp box 14 is moved in a counter-clockwise direction about the pivots 13 to tilt the projection machine in the opposite direction. Alignment of the projection machine is thus provided.

The lamp box 14 is internally provided in the back thereof with a sheet 32 of insulating material to protect the box from the heat given off by the lamp 17. Suitably secured, as by welding, to the upper end of the lamp box 14 is a flange 33 which receives a latticed cover 34. The cover 34 is open, but is provided with a crisscross lattice formed from strips 35. Some of the lattice strips, such as 36, extend downwardly and are secured, as by welding, to a light-concentrating box 37 for supporting the latter. The light-concentrating box 37 encompasses the lamp 17 and is provided on its sides, as shown in Figures 3 to 5, with spring arms 38 having catches 39 adapted to be received under the flange 33 for holding the cover 34 and light-concentrating box 37 in the lamp box 14. The ends of the spring arms 38 are provided with buttons 40 extending through suitable openings in the cover 34 whereby the spring arms 38 may be pressed inwardly to release the catches 39 from under the flange 33 so that the cover 34 and the light-concentrating box 37 may be removed.

The rear of the light-concentrating box 37 is provided with an opening 42 for receiving a concave reflecting mirror 43 which is carried by clamps 44 in turn secured by a rivet 45 to a bracket 46. The bracket 46 is secured by screws 47 to the light-concentrating box 37 for holding the reflector 43 in the opening 42.

The light-concentrating box 37 is provided internally with a pair of concentric cylinders 50 and 51, the cylinder 50 being suitably secured to the cylinder 51 and the latter being secured by brackets 52 to the side walls of the light-concentrating box 37. The inner cylinder 50 terminates short of the reflector 43 and the outer cylinder 51 is provided with openings 53 and 54 to permit the light generated by the lamp 17 to be reflected forwardly by the reflector 43. The opaque top 18 of the lamp 17, when taken in conjunction with the cylinders 50 and 51 and the latticed cover 34, prevents light from escaping from the light box 14, while at the same time, providing free circulation of air through the lamp box 14 to dissipate the heat generated by the lamp 17.

Secured, as by welding, to the front of the light-concentrating box 37 are U-shaped brackets 56 and 57 which provide supports for the filters and concentrating lenses. The bracket 57 is provided with a plurality of notches 58 of the same depth, and the bracket 56 is provided with a series of notches 59, 60, 61, and 62 of varying depth. The bracket 57 and the front wall of the light-concentrating box 37 are provided with aligned holes 63.

The various notches are adapted to receive plates 65, 66, 67, and 68 respectively. The plates are of varying height and, therefore, cooperate with the notches of varying depth to insure that plates 65, 66, 67, and 68 may be received only in notches 59, 60, 61, and 62 respectively. The plates are provided with side flanges 69 to limit inward movement of the plates when they are inserted in the notches, the flanges engaging the side of the brackets 56 and 57. The plates are apertured and are provided with fingers 70 for securing the filters and the concentrating lenses in the plate apertures. Each of the plates is also provided with a hole 71. As shown, the plates 65, 66, 67, and 68 carry respectively in the apertures therein, a filter 72, a concentrating lens 73, a filter 74, and a concentrating lens 75. A pin 76 is adapted to be inserted through the aligned holes 63 and 71 when the plates are properly received in the notches. The pin 76, therefore, retains the plates in position in the notches and the pin may be provided with a hook 77 engaging the bottom bracket 57 for maintaining the pin 76 in place.

By reason of this filter and concentrating lens supporting arrangement, the filter and concentrating lenses may be readily removed and cleaned and may be readily repositioned in the projection machine. The filter and concentrating lenses may only be positioned in the projection machine in a predetermined sequence whereby improper insertion thereof is prevented.

Referring now to Figures 2 and 7, the front of the lamp box 14 is provided with an opening 80 in alignment with the reflector 43 and the filters and concentrating lenses, and secured to the front of the lamp box 14 is a frame split vertically in two parts 81 and 82. The frame is also provided with an extension 83 for telescopingly receiving a tube 84 carrying the focusing lens 85. A friction roller 86 operated by a knob 87 is utilized for longitudinally adjusting the tubes 84 in the extension 83 for focusing the projection machine.

The frame, composed of parts 81 and 82, is provided with a horizontal opening, defined by surfaces 90 of the frame which serve as a slide shifter support. This support is adapted to receive a slide shifter 91 carrying a shifting mechanism 92 operated by knobs 93. Slides may be inserted in the shifting mechanism 92, and by manipulating the knobs 93, the slides may be brought into alignment with the opening 80 in the lamp box 14. When the slide shifter 91 is removed from the slide shifter support 90, the side openings of the support 90 may be closed by a closure member 94, as illustrated in Figure 8. One side of the closure member 94 is enlarged, as at 95, to limit the movement thereof in the support 90, and the closure member 94 may be inserted or withdrawn by a knob 96. The purpose of the closure member 94 is to prevent the passage of light through the side openings in the slide shifter support 90. The slide shifter 91 or the closure member 94 may be retained in the slide shifter support 90 by means of a screw 97. The slide shifter 91 and the slides operated thereby are contained in one transverse plane between the source of light provided by the lamp 17 and the adjustable focusing lens 85.

A film guide 98, provided with a light transmitting aperture 99, is also carried by the frame 81. The front face of the film guide 98, having the aperture 99, is preferably curved, as illustrated in Figures 2, 14, and 15, so that when the film to be projected is drawn thereover, it is prevented from curling due to the heat from the lamp 17. The film guide 98 is provided with lateral flanges, and one of these flanges carries a pair of pins 100 received in sleeves 101 carried between the frame parts 81 and 82, as shown in Figure 10. The other flange of the film guide 98 is provided with holes 102 for receiving the sleeves 101. The pins 100 and the holes 102, therefore, support the film guide 98 and permit lateral movement thereof out of the path of light between the concentrating lenses and the focusing lens. The film guide may be laterally moved by a suitable knob 103 carried thereby. In this way, the film guide with its relatively small aperture 99 may be moved out of the way when slides are being projected.

The film guide 98 is in a different transverse plane between the source of light and the focusing lens 85 than the slide support 90, and the location of the slides and the film in these different transverse planes may be readily compensated for by proper adjustment of the focusing lens 85 through rotation of the knob 87.

When it is desired to project from film, the film guide 98 with its aperture 99 is placed in the path of light, the slide shifter 91 is removed, and the slide shifter support 90 is closed by the closure member 94, as is illustrated in Figures 1, 2, and 10. When, however, it is desired to project from slides, the closure member 94 is removed, the slide shifter 91 is inserted in the slide shifter support 90, and the film guide 98 is moved out of the path of light, as is illustrated in Figures 7 and 9. This two-plane projection arrangement for films and slides therefore provides a simple means for alternately projecting films or slides without the necessity of dismantling the projection machine and converting it from a slide projector to a film projector or vice-versa.

The film to be projected is drawn across the film guide 98 by a sprocket 105 having teeth engaging in the usual film openings. As seen in Figure 10, the sprocket 105 is carried by a shaft 107 having a key slot 108. A pin 109 in the sprocket 105 engages in the key slot 108 so that the sprocket 105 rotates with the shaft 107. One end of the shaft 107 is journaled in a boss 110 on the frame part 82 and the other end of the shaft extends through a sleeve 111 mounted in a boss 112 on the frame part 81. The sleeve 111 is provided with a shoulder 113 on one side of the boss 112 and carries on the other side of the boss a friction washer 114 and a first part 115 of a detent mechanism. This part 115 is provided with cam surfaces 116 and an extension 117. A spring washer 118 abuts the detent part 115 and is held in place by a peened-over portion 119 of the sleeve 111 at the end of the latter. The spring washer 118 holds the first part 115 of the detent mechanism in engagement with the friction washer 114 so that the detent part 115 is normally maintained stationary with respect to the frame 81.

The detent mechanism includes a second part 121 carried on the shaft 107, and this second part 121 is provided with a pair of studs 122 carrying cam followers or rollers 123. The rollers 123 engage the cam surfaces 116 of the first part 115 of the detent mechanism.

The end of the shaft 107 is squared, as indicated at 125, and this squared portion carries a knob 126 having a squared opening 127 engaging the end of the shaft. A screw 128 threaded into the end of the shaft 127 holds the knob 126 on the shaft. A washer 129 also having a squared opening is carried adjacent the end of the shaft and abuts the inner surface of the knob 126. A spring 130 is interposed between the spring washer 129 and the second part 121 of the detent mechanism. The spring performs a double function of urging the rollers 123 into engagement with the cam surfaces 116 and urging the knob 126 outwardly. The knob 126 is provided with an internal sleeve 131 provided with four grooves 132. Two of the grooves 132 receive the studs 122.

The rollers 123 rest in the valleys between the cam surfaces 116, thereby normally holding the shaft 107 and the sprocket 105 stationary and in predetermined positions. When the knob 126 is rotated, it rotates the shaft 107 and hence the sprocket 105 and it also rotates the second part 121 of the detent mechanism carrying the rollers 123 therewith. The rollers ride up the cam surfaces 116 from one valley and then fall into the next valley. The spring 130 permits the rollers 123 to be retracted by the cam surfaces 116 as the shaft 107 and the sprocket 105 are moved from one predetermined position to the next. In this way, a detent mechanism is provided for moving the sprocket 105 to predetermined positions with respect to the frame 81. The parts are so arranged that the movement of the mechanism from one detent position to the next corresponds to the movement of a single frame on the film to be projected. Thus the detent mechanism controlling the movement of the sprocket 105 advances the film to be projected one frame at a time.

In order to line-up the frame of the film to be projected with the aperture 99 in the film guide 98, the knob 126 is pressed inwardly against the action of the spring 130 and one of the grooves 132 in the sleeve 131 formed in the knob 126 engages the extension 117 of the first part 115 of the detent mechanism. Upon rotation of the knob, the part 115 is carried along so that the part 115 is reset to the proper position in order to line up the film with the aperture 99.

The film to be projected is fed to the film guide 98 and is maintained under tension along the film guide 98 by a hold back and reverse feed sprocket 135 having teeth 136 engaging in the usual openings in the film. One end of the sprocket 135 is secured to a stub shaft 137 journaled in a boss 138 on the frame part 82. The inner end of the stub shaft 137 is provided with a slot 139. The other end of the sprocket 135 is rotatably mounted on a shaft 140 journaled in a boss 141 formed on the frame part 81. The shaft 140 is provided with a flange 142 which engages a friction washer 143 carried in the boss 141. A spring washer 144 is interposed between the frame part 81 and a knob 145 which is securely fastened to the shaft 140. The spring washer 144 urges the flange 142 against the friction washer 143 to provide a friction brake for retarding the rotation of the shaft 140. The inner end of the shaft 140 is provided with a slot 146. A tension spring 147 is carried in the sprocket 135 and has its ends engaging in the slots 139 and 146. The flange 142 is provided with a flattened surface 148 over which extends a pin 149 carried in the end of the sprocket 135. The flattened surface 148 provides a pair of spaced stops for the pin 149 whereby a lost motion connection is provided between the sprocket 135 and the shaft 140.

The torsion spring 147 biases the sprocket 135 and pin 149 to the rear, as viewed in Figures 10 and 11, so that when the film is drawn over the film guide, the sprocket 135 is first turned against the tension of the spring 147 and then the pin 149 is brought into engagement with the forward edge of the flattened surface 148, at which time the shaft 140 is caused to rotate against the action of the friction brake. The spring 147, therefore, holds back and maintains the film on the film guide in tension at all times, and as the film is advanced, the shaft 140 is turned against the action of the friction brake. This placing of tension in the film while it is on the curved film guide prevents curling of the film due to the heat from the lamp 17. By manipulating the knob 145, the sprocket 135 may feed the film in the opposite direction along the film guide, thereby providing a reverse feed. The detent mechanism associated with the sprocket 105 will maintain the film frames in alignment with the aperture 99 in the film guide 98 during the reverse feeding of the film.

Located above the sprocket 135 is a container 155 for holding rolled film to be projected. The container is provided with a peripheral wall 156 and is closed on one side, but open on the other. The open side permits lateral placement of the rolled film in the container 155. A post 157 carried in the container may be utilized for carrying the rolled film. The container 155 is secured to the frame by means of screws 158.

A pivoted arm 160 is utilized for holding the film against the sprocket 135. The pivoted arm 160 is provided with ears 161 pivoted to a shaft 162 which, in turn, is carried in the frame. A torsion spring 163 urges the pivoted arm 160 away from the sprocket 135, as is shown in Figure 14. The pivoted arm 160 is provided with slots 164 for accommodating the teeth 136 of the sprocket 135 and is also provided with a stop 165.

A pivoted lever 167 having a knob 168 is utilized for moving the pivoted arm 160 toward the sprocket 135 against the action of the torsion spring 163. In this connection, the pivoted lever 167 is provided with a crank arm portion 169 and is pivotally mounted in a bearing 170 carried by the container 155.

When the pivoted lever 167 is in the position shown in Figure 14, the pivoted arm 160 is retracted by the spring 167 so that the film may be inserted in the container 155 and on the sprocket 135. After the film is in place, the lever 167 is moved from the position shown in Figure 14 to the position shown in Figure 15 where the portion 169 thereof engages the stop 165 and wherein the lever 167 is received in a catch 171, shown in Figure 16, formed on the container 155. The lever 167 causes the pivoted arm 160 to hold the film against the sprocket 135 and also extends across the open side of the container 155 to prevent the rolled film from falling out of the container.

Located adjacent the sprocket 105 is a second pivoted arm 173 for holding the film against the sprocket 105. The pivoted arm 173 is provided with ears 174 pivoted on a shaft 175 carried by the frame. A torsion spring 176 biases the pivoted arm 173 away from the sprocket 105. The pivoted arm 173 is provided with slots 177 for accommodating the teeth 106 of the sprocket 105 and is also provided with a stop 178. A pivoted lever 179 having a knob 180 and a crank portion 181 is carried by a bearing 182 carried on a guide 183 having a peripheral guide portion 184. The guide 183 is secured to the frame by screws 185. The peripheral guide portion 184 guides the film as it leaves the sprocket 105.

With the pivoted lever 179 in the position shown in Figure 14, the pivoted arm 173 is retracted by spring 176 so that the film may be placed over the sprocket 105. When the pivoted lever 179 is moved to the position shown in Figure 15, the pivoted arm is moved toward the sprocket 105 against the action of the spring 176 to hold the film on the sprocket 105. As will be noted in Figure 15, the pivoted lever 179 is substantially normal to the pivoted arm 173 so that the spring 176 has no tendency to swing the pivoted lever 179 from the position shown in Figure 15. In this way, the parts are locked in the Figure 15 position. When, however, the lever 179 is moved out of the Figure 15 position toward the Figure 14 position, the spring 176 urges and retains the parts in the position shown in Figure 14.

The pivoted arms 160 and 173 and the pivoted levers 167 and 179 provide a simple mechanism for maintaining the film against the sprockets 135 and 105, but still permit ready insertion and removal of the film. In addition, the pivoted lever 167 provides the further function of maintaining the rolled film in the container 155.

Generally speaking, the claims of this application are directed to the two-plane feature for projecting slides or film, to the friction brake feature, to the reverse feeding feature, and to various combinations thereof. Claims directed to other disclosed features are contained in the copending application of Thomas I. Ress, Serial No. 700,087, filed September 28, 1946.

While for purposes of illustration one form of this invention has been disclosed, other forms thereof may become apparent to those skilled in the art upon reference to this disclosure, and, therefore, this invention is to be limited only by the scope of the appended claims.

What is claimed is:

1. In a projection machine comprising a light source, a supporting member having an aperture, and a converging and a focusing lens respectively arranged in axial alignment with each other and with the aperture on opposite sides of the supporting member; a film guide arranged between the aperture and the focusing lens and having a light opening, means mounting said film guide on the supporting member for lateral movement between positions respectively wherein the light opening is disposed coaxial with the aperture and lenses and wherein the film guide is withdrawn from the path of a light beam passing from the converging to the focusing lens through the aperture, and slide supporting surfaces on the supporting member between its said aperture and the converging lens.

2. In a projection machine comprising a light source and axially spaced and aligned rearward converging and forward focusing lenses; a supporting member interposed between said converging and focusing lenses and comprising a body extended across the path of a light beam passing from the converging to the focusing lens, said body having a light passage therethrough comprising an aperture extended rearward from the front surface of the body a limited distance in coaxial relation to the lenses and a slide chamber in said body in the rear of said aperture and opening through the rear surface of said body, a film guide spaced forward from the aperture toward the focusing lens and having a light opening, and means mounting the film guide on the supporting member for lateral movement between positions respectively wherein the light opening is coaxial with the aperture and lenses and wherein the film guide is withdrawn from the path of a light beam passing from the converging to the focusing lens through the aperture, surfaces of the body bounding the slide chamber providing means for supporting a slide in registration with the aperture.

3. In a projection machine comprising a light source and axially spaced and aligned rearward converging and forward focusing lenses; a supporting structure interposed between the converging and focusing lenses including a body extended across the path of a light beam passing from the converging to the focusing lens and having therethrough an opening providing a light passage for such a beam, said body having parts extended forward at opposite sides of the path of such a light beam, a film guide extended across the forward surfaces of said parts and having an aperture, a flange on said guide extended rearwardly between said parts, and a rod extended transversely between said parts and slidably penetrating said flange whereby said film guide may be slid upon said rod from a position extended across said light path and with its aperture coaxial therewith to a position outside said light path.

4. In a projection machine comprising a light source and axially spaced and aligned rearward converging and forward focusing lenses; a supporting structure interposed between the converging and focusing lenses including a body extended across the path of a light beam passing from the converging to the focusing lens and having therethrough an opening providing a light passage for such a beam, said body having parts extended forward at opposite sides of the path of such a light beam, a film guide extended across the forward surfaces of said parts and having an aperture, a flange on said guide extended rearwardly between said parts, a rod extended transversely between said parts and slidably penetrating said flange whereby said film guide may be slid upon said rod from a position extended across the said light path and with its aperture coaxial therewith to a position outside said light path, and sprockets mounted between said forwardly extended parts of the supporting structure above and below the film guide for alignment with said guide when in the first of its said positions.

ARTHUR J. BRADFORD.

REFERENCES CITED

The following references are of record in the file of this patent:

UNITED STATES PATENTS

| Number | Name | Date |
|---|---|---|
| 1,104,873 | Butcher | July 28, 1914 |
| 1,513,920 | Mechau | Nov. 4, 1924 |
| 1,548,573 | Ackley | Aug. 4, 1925 |
| 1,704,814 | Wellman | Mar. 12, 1929 |
| 1,856,482 | Hunt | May 3, 1932 |
| 1,939,561 | Martin | Dec. 12, 1933 |
| 1,956,391 | Kuppenbender et al. | Apr. 24, 1934 |
| 2,120,249 | Holman | June 14, 1938 |
| 2,159,616 | Kleerup | May 23, 1939 |
| 2,231,743 | Young et al. | Feb. 11, 1941 |
| 2,251,077 | Stanton | July 29, 1941 |
| 2,285,915 | Dutton | June 9, 1942 |
| 2,292,966 | Osterberg et al. | Aug. 11, 1942 |
| 2,412,551 | Pratt et al. | Dec. 10, 1946 |